United States Patent
Beak et al.

(10) Patent No.: US 9,419,745 B2
(45) Date of Patent: Aug. 16, 2016

(54) SYSTEM FOR DETECTING SIGNAL BASED ON PARTIAL MAXIMUM LIKELIHOOD AND METHOD THEREOF

(71) Applicant: Electronics and Telecommunications Research Institute, Daejeon (KR)

(72) Inventors: Myung Sun Beak, Daejeon (KR); Hun Hee Lee, Daejeon (KR); Hyoung Soo Lim, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/606,150

(22) Filed: Jan. 27, 2015

(65) Prior Publication Data

US 2015/0326411 A1    Nov. 12, 2015

(30) Foreign Application Priority Data

May 7, 2014    (KR) .......................... 10-2014-0054392

(51) Int. Cl.
*H04L 1/00* (2006.01)
*H04L 25/03* (2006.01)

(52) U.S. Cl.
CPC ................ *H04L 1/00* (2013.01); *H04L 1/0054* (2013.01); *H04L 25/03* (2013.01); *H04L 25/03057* (2013.01); *H04L 25/03299* (2013.01); *H04L 25/03343* (2013.01); *H04L 25/03993* (2013.01)

(58) Field of Classification Search
CPC ............ H04L 1/0054; H04L 25/03057; H04L 25/03299; H04L 25/03343; H04L 25/03993; H04L 25/497; H03M 13/41
See application file for complete search history.

(56) References Cited

U.S. PATENT DOCUMENTS

| | | | | |
|---|---|---|---|---|
| 8,320,507 B2 * | 11/2012 | Higuchi | ............... | H04B 7/0413 375/259 |
| 8,571,131 B1 * | 10/2013 | Eliaz | .............................. | 375/285 |
| 8,737,540 B1 * | 5/2014 | Shi | .......................... | H04L 27/06 375/340 |
| 2009/0028265 A1 | 1/2009 | Lee et al. | | |
| 2009/0147890 A1 * | 6/2009 | Lee et al. | ....................... | 375/341 |
| 2013/0182791 A1 * | 7/2013 | Dhakal | ................ | H04B 7/0456 375/295 |
| 2013/0343496 A1 * | 12/2013 | Eliaz et al. | .................... | 375/341 |

FOREIGN PATENT DOCUMENTS

| KR | 1020080109201 A | 12/2008 |
|---|---|---|
| KR | 1020110057000 A | 5/2011 |

* cited by examiner

*Primary Examiner* — Jean B Corrielus
(74) *Attorney, Agent, or Firm* — William Park & Associates Ltd.

(57) ABSTRACT

Disclosed is a receiver including: a partial filter generating unit selecting a signal as large as a predetermined magnitude among sampled signals and extracting a filter coefficient for the selected signal magnitude to perform QR resolution for the filter coefficient; a partial ML setting unit determining the lengths and the number of candidate symbol combinations of a signal to be detected and generating a candidate ML symbol combination based on the determined lengths and number of candidate symbol combinations; a signal detecting unit detecting residual symbols in a predetermined part of the sampled signal based on the generated candidate ML symbol combination; and a final signal selecting unit choosing a candidate symbol closest to the sampled signal among the detected candidate symbols as a finally detected signal.

7 Claims, 5 Drawing Sheets

SYSTEM FOR DETECTING SIGNAL BASED ON PARTIAL MAXIMUM LIKELIHOOD AND METHOD THEREOF

CROSS-REFERENCE TO RELATED APPLICATIONS

This application claims priority to and the benefit of Korean Patent Application No. 10-2014-0054392 filed in the Korean Intellectual Property Office on May 7, 2014, the entire contents of which are incorporated herein by reference.

TECHNICAL FIELD

The present invention relates to a system for detecting a signal based on partial maximum likelihood (ML) and a method thereof, and particularly, to a system for detecting a signal based on partial ML and a method thereof that detect a signal in a communication system through Faster-Than-Nyquist transmission technology.

BACKGROUND

A communication system transmits and receives a signal so as to prevent inter-symbol-interference (ISI) from being occurred in a step of detecting a signal.

Further, in a Faster-Than-Nyquist (FTN) transmission method that transmits the signal faster than the corresponding communication system, the ISI necessarily occurs.

The FTN transmission method causes the ISI to necessarily occur, but may constantly increase a symbol transmission speed without loss of bit error rate (BER), and requires a transceiver having very high complexity in order to increase the symbol transmission speed.

SUMMARY OF THE INVENTION

The present invention has been made in an effort to provide a system for detecting a signal based on partial ML and a method thereof that detect a signal by applying partial ML to a signal transmitted through an FTN transmission scheme.

An exemplary embodiment of the present invention provides a receiver including: a partial filter generating unit selecting a signal as large as a predetermined magnitude among sampled signals and extracting a filter coefficient for the selected signal magnitude to perform QR resolution for the filter coefficient; a partial ML setting unit determining the lengths and the number of candidate symbol combinations of a signal to be detected and generating a candidate ML symbol combination based on the determined lengths and number of candidate symbol combinations; a signal detecting unit detecting residual symbols in a predetermined part of the sampled signal based on the generated candidate ML symbol combination; and a final signal selecting unit choosing a candidate symbol closest to the sampled signal among the detected candidate symbols as a finally detected signal.

The receiver may further include: a reception filter receiving a signal transmitted from a transmitter included in a signal detecting system; and a sampler sampling the received signal at a predetermined symbol transmission speed.

The receiver and the transmitter may be connected through an additive white Gaussian noise (AWGN) channel.

An output of the sampler may be acquired by adding noise to a product of a coefficient of a transmission filter included in the transmitter, a coefficient of the reception filter, and a transmission symbol corresponding to a signal received through the reception filter.

The partial filter generating unit may divide a sampled signal having a length of L elements to M elements corresponding to the predetermined part to perform partial detection for M signals through L/M procedures, wherein L and M may be natural numbers and L/M may not be 0.

The partial ML setting unit may generate the candidate ML symbol combination through a maximum likelihood (ML) technique.

The signal detecting unit may detect the residual symbols through a decision feedback equalization (DFE) technique.

Another exemplary embodiment of the present invention provides a method for detecting a signal through a transmitter, including: selecting, by a partial filter generating unit, a signal as large as a predetermined magnitude among sampled signals and extracting a filter coefficient for the selected signal to perform QR resolution for the filter coefficient; determining, by a partial ML setting unit, the lengths and the number of candidate symbol combinations of a signal to be detected; generating, by the partial ML setting unit, a candidate ML symbol combination based on the determined lengths and number of candidate symbol combinations; detecting, by a signal detecting unit, residual symbols in a predetermined part of the sampled signal based on the generated candidate ML symbol combination; and choosing, by a final signal selecting unit, a candidate symbol closest to the sampled signal among the detected candidate symbols as a finally detected signal.

The method may further include: receiving, by a reception filter, a signal transmitted from a transmitter included in a signal detecting system; and sampling, by a sampler, the received signal at a predetermined symbol transmission speed to acquire the sampled signal.

In the performing of the partial detection as large as the predetermined part among the sampled signals, a sampled signal having L lengths is divided into M elements corresponding to the predetermined part to partially detect M signals through L/M procedures.

In the generating of the candidate ML symbol combination, the candidate ML symbol combination may be generated through an ML technique.

In the detecting of the residual symbols, the residual symbols may be detected through a DFE technique.

According to exemplary embodiments of the present invention, a system for detecting a signal based on partial ML and a method thereof detect a signal by applying partial ML to a signal transmitted through an FTN transmission scheme to easily and simply detect the transmitted signal and sequentially detect received signals to reduce a detection delay time of the signals and avoid an excessively large matrix calculation, thereby significantly reducing the use of a memory.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the present invention are used to just describe a specific exemplary embodiment and do not intend to limit the present invention. Unless otherwise defined, the technical terms used in the present invention should be interpreted as meanings generally appreciated by those skilled in the art and should not be interpreted as excessively comprehensive meanings or excessively reduced meanings. When the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Unless otherwise apparently specified contextually, a singular expression used in the present invention includes a plural expression. In the present invention, a term such as "comprising" or "including" should not be interpreted as necessarily including all various components or various steps disclosed in the invention, and it should be interpreted that some component or some steps among them may not be included or additional components or steps may be further included.

Terms including ordinal numbers, such as 'first' and 'second', used in the present invention can be used to describe various components, but the components should not be limited by the terms. The above terminologies are used only for distinguishing one component from the other component. For example, a first component may be named a second component and similarly, the second component may also be named the first component, without departing from the scope of the present invention.

Hereinafter, exemplary embodiments of the present invention will be described in detail with reference to the accompanying drawings, in which like reference numerals refer to like or similar elements regardless of reference numerals and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are only for easily understanding the spirit of the present invention and it should not be interpreted that the spirit of the present invention is limited by the accompanying drawings.

Figure 1:
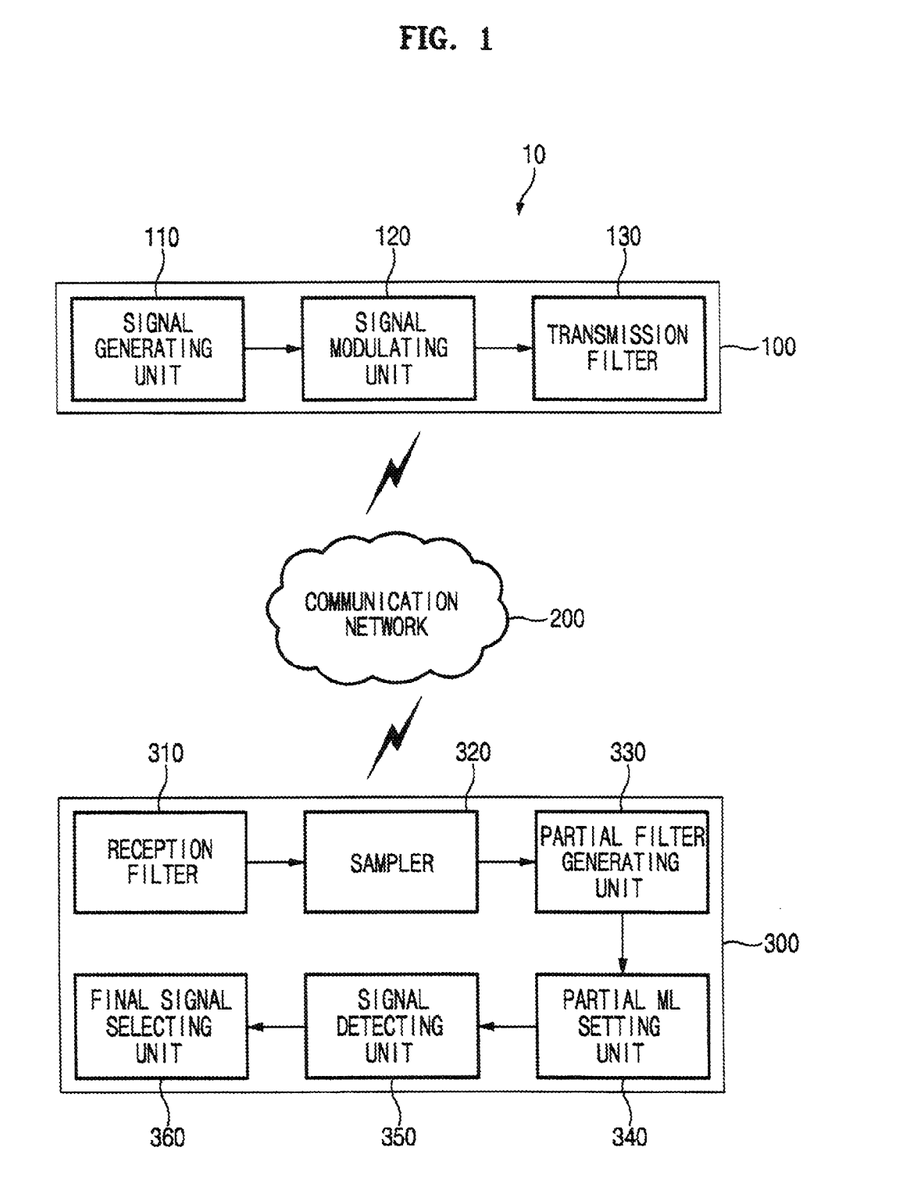
FIG. 1 is a configuration diagram of a system for detecting a signal according to an exemplary embodiment of the present invention.

FIG. 1 is a configuration diagram of a system (alternatively, a communication system) 10 for detecting a signal according to an exemplary embodiment of the present invention.

As illustrated in FIG. 1, the signal detecting system 10 includes a transmitter 100, a communication network 200, and a receiver 300. All constituent elements of the signal detecting system 10 illustrated in FIG. 1 are not required, and the signal detecting system 10 may be implemented by more or fewer constituent elements than the constituent elements illustrated in FIG. 1.

The transmitter 100 transmits a transmission signal based on Faster-Than-Nyquist (FTN) to the receiver 300 through the communication network 200. Thereafter, the receiver 300 samples the signal transmitted from the transmitter 100 as large as a value to which the FTN is applied and thereafter, selects a signal as large as a predetermined magnitude among the sampled signals and extracts a filter coefficient for the selected signal to perform QR resolution of the corresponding filter coefficient. Thereafter, the receiver 300 generates a candidate ML symbol combination based on the lengths and the number of candidate symbol combinations of determined signals to be detected and detects residual symbols among sampled signals based on the generated candidate ML symbols. Thereafter, the receiver 300 selects, as a finally detected signal, a candidate symbol closest to a sampled signal among a plurality of candidate symbols detected by performing a predetermined simplified ML examination. Further, the receiver 300 selects, as the finally detected signal, each of the candidate symbols closest to all sampled signals by repeatedly performing the step of performing partial detection on a predetermined part corresponding to a next part among all of the sampled signals.

As illustrated in FIG. 1, the transmitter 100 includes a signal generating unit 110, a signal modulating unit 120, and a transmission filter 130. All constituent elements of the transmitter 100 illustrated in FIG. 1 are not required, and the transmitter 100 may be implemented by more or fewer constituent elements than the constituent elements illustrated in FIG. 1.

The signal generating unit 110 generates (alternatively, creates) a signal (alternatively, a digital signal).

The signal generating unit 110 transfers (alternatively, transmits) the generated (alternatively, created) signal to the signal modulating unit 120.

The signal modulating unit 120 modulates the signal generated by the signal generating unit 110 to a predetermined specific symbol. Herein, a modulation method may include a phase shift keying (PSK) scheme, a quadrature amplitude modulation (QAM) scheme, and the like.

The signal modulating unit 120 transfers the modulated signal (for example, a(t)) to the transmission filter 130.

The transmission filter 130 is a Faster-Than-Nyquist (hereinafter, referred to as FTN) based filter.

The transmission filter 130 linearly modulates the signal modulated through the signal modulating unit 120 at a predetermined symbol transmission speed (for example, $\tau T$). Herein, $\tau$ represents a sampling time control function (factor) and is selected (alternatively, set) as any one of values which are larger than 0 and smaller than 1.

The transmission filter 130 transmits the linearly modulated signal (alternatively, the transmission signal) (for example, s(t)) to the receiver 300 through a communication network (alternatively, an additive white Gaussian noise (AWGN) channel) 200.

The signal s(t) transmitted by the transmission filter 130 may be expressed by [Equation 1] given below.

$$s(t) = \sum_k a_k g(t - k\tau T)$$ [Equation 1]

Where, $a_k$ represents a k-th transmitted symbol, g(t) represents the transmission filter, and τ represents the sampling time control function.

When a condition of 0<τ<1 is set in a transmitting unit (alternatively, the transmitter 100), transmission filters (for example, the transmission filter and a reception filter) overlap with each other, and as a result, inter-symbol interference (ISI) occurs. In this case, as a value of τ decreases, the number of overlapped symbols is increased, and as a result, large ISI occurs. However, since a small value of τ makes a transmission cycle of the signal be faster, a transmission rate is improved. Theoretically, τ=0.5 represents that the transmission rate may be improved twice.

As illustrated in FIG. 1, the receiver 300 includes a reception filter 310, a sampler 320, a partial filter generating unit 330, a partial ML setting unit 340, a signal detecting unit 350, and a final signal selecting unit 360. All constituent elements of the receiver 300 illustrated in FIG. 1 are not required, and the receiver 300 may be implemented by more or fewer constituent elements than the constituent elements illustrated in FIG. 1.

The reception filter 310 receives the signal (alternatively, the transmission signal) transmitted by the transmitter 100 through the communication network (alternatively, the AWGN channel) 200. Herein, a signal received in an FTN environment includes interference between prior and post symbols of the target symbol. Accordingly, the following procedure is performed in order to detect the signal in the FTN environment where the interference exists.

The reception filter 310 is provided to minimize an influence by noise by filtering noise of the received signal (for example, r(t)) or to match the transmission filter.

The reception filter 310 transfers a filtered signal (for example, y(t)) to the sampler 320.

The sampler 320 samples the signal filtered by the reception filter 310 at an inverse number (for example, 1/τT) of the predetermined symbol transmission speed (for example, τT).

The signal y(nτT) sampled by the sampler 320 may be expressed by [Equation 2] given below.

$$y(n\tau T) = \sum_k a_k x((n-k)\tau T) + w(n\tau T)$$ [Equation 2]

Where, x(t)=g(t)*g*(-t). Further, w(t) represents noise, and represents a Gaussian random process in which an average is 0 and an auto-correlation function is $$R_{ww}(u) = \frac{N_0}{2} x(u).$$

In this case, as known from the auto-correlation function $R_{ww}(u)$, a correlation among samples exists under the condition of 0<τ<1. Accordingly, the transmitted signal may be effectively detected by removing the corresponding interference.

When the length of the transmission signal is L symbols, the transmission symbol A may be expressed by a vector column having L elements as shown in [Equation 3] given below.

$$A = [a_1 a_2 \ldots a_L]$$ [Equation 3]

Figure 2:
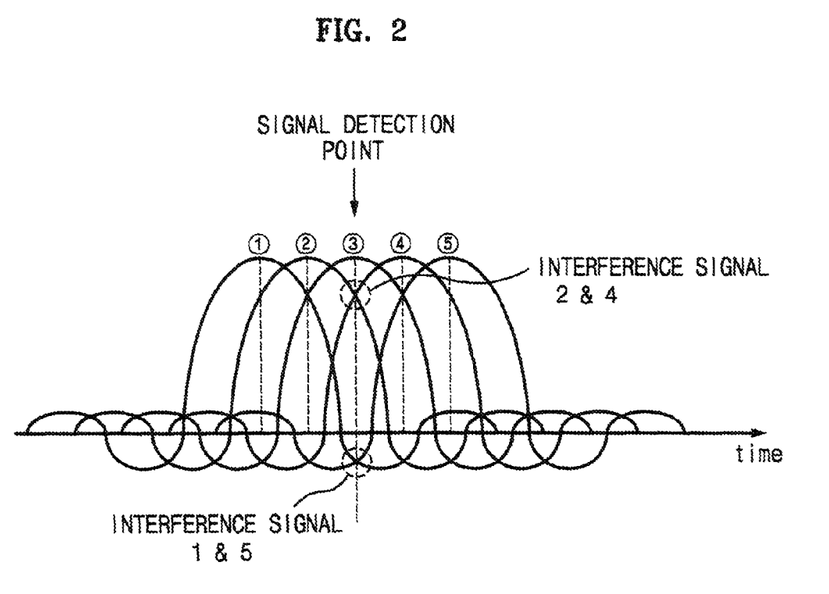
FIG. 2 is a diagram illustrating signal modeling when a target signal is a third signal according to the exemplary embodiment of the present invention.

When the transmitted signal is detected as described above, the prior and post signals of the target signal to be detected as illustrated in FIG. 2 exist as interference by the interference between the filters (for example, the transmission filter 130 and the reception filter 310). Herein, FIG. 2 illustrates an interference signal when a third transmission signal is detected. That is, the number of interference signals illustrated in FIG. 2 is constantly determined according to the size of τ and when the size of τ is decreased, a gap between the filters is narrowed to increase the number of interference signals. When the number of symbols prior to the signal to be detected is N upon detecting a specific symbol, in the case of FIG. 2, N=2 when a third detection signal is detected. In addition, the number of interferences of symbols after detecting the third detection signal is also 2 which is the same as the number of prior symbols. That is, two signals before and two signals after the symbol to be detected serve as the interference. As illustrated in FIG. 2, the prior symbol and the post symbol serve as the interference at the same position, and as a result, the same filter coefficient is applied.

The sampler 320 models a case in which the interference signal is N as shown in [Equation 4].

$$y_T = [x_1 x_2 \ldots x_N x_T x_N \ldots x_2 x_1] \begin{bmatrix} a_{T-N} \\ a_{T-N+1} \\ \vdots \\ a_{T-1} \\ a_T \\ a_{T+1} \\ \vdots \\ a_{T+N-1} \\ a_{T+N} \end{bmatrix}$$ [Equation 4]

Where, $x_n$ represents a coefficient of a filter applied to an n-th interference signal and $x_T$ represents a coefficient of a filter applied to a target signal to be detected.

The modeling shown in [Equation 4] may be applied to total signal modeling. That is, signal modeling through the sampler 320 when N=2 and L=8 may be expressed by [Equation 5] given below.

$$Y = XA + W =$$
$$\begin{bmatrix} x_T & x_2 & x_1 & 0 & 0 & 0 & 0 & 0 \\ x_2 & x_T & x_2 & x_1 & 0 & 0 & 0 & 0 \\ x_1 & x_2 & x_T & x_2 & x_1 & 0 & 0 & 0 \\ 0 & x_1 & x_2 & x_T & x_2 & x_1 & 0 & 0 \\ 0 & 0 & x_1 & x_2 & x_T & x_2 & x_1 & 0 \\ 0 & 0 & 0 & x_1 & x_2 & x_T & x_2 & x_1 \\ 0 & 0 & 0 & 0 & x_1 & x_2 & x_T & x_1 \\ 0 & 0 & 0 & 0 & 0 & x_1 & x_2 & x_T \end{bmatrix} \begin{bmatrix} a_1 \\ a_2 \\ a_3 \\ a_4 \\ a_5 \\ a_6 \\ a_7 \\ a_8 \end{bmatrix} + \begin{bmatrix} w_1 \\ w_2 \\ w_3 \\ w_4 \\ w_5 \\ w_6 \\ w_7 \\ w_8 \end{bmatrix}$$ [Equation 5]

Where, Y represents an output of the sampler 320, X represents the coefficient of the filter (the transmission filter and the reception filter), A represents the transmission symbol, and W represents the noise.

The sampler 320 transfers the sampled signal y(nτT) to the partial filter generating unit 330.

The partial filter generating unit 330 extracts the filter coefficients as large as a predetermined part (for example, M*M, M is a natural number).

That is, in the present invention, a signal detected in one detection procedure is divided into M to be detected. When such a procedure is performed, the signal having the length of L elements is not detected at one time but M signals are detected through (alternatively, by repeatedly performing) L/M procedures. Where, M and L are natural numbers and L/M is not 0.

Partial extraction by the partial filter generating unit 330 may be expressed by [Equation 6] given below.

$$X^{(1)} = \begin{bmatrix} X_{1,1} & X_{1,2} & \cdots & X_{1,M} \\ X_{2,1} & X_{2,2} & \cdots & X_{2,M} \\ \vdots & \vdots & \ddots & \vdots \\ X_{M,1} & X_{M,2} & \cdots & X_{M,M} \end{bmatrix}$$
$$= \begin{bmatrix} X^{(1)}_{1,1} & X^{(1)}_{1,2} & \cdots & X^{(1)}_{1,M} \\ X^{(1)}_{2,1} & X^{(1)}_{2,2} & \cdots & X^{(1)}_{2,M} \\ \vdots & \vdots & \ddots & \vdots \\ X^{(1)}_{M,1} & X^{(1)}_{M,2} & \cdots & X^{(1)}_{M,M} \end{bmatrix}$$
$$= Q^{(1)} R^{(1)}$$
$$= \begin{bmatrix} Q_{1,1} & Q_{1,2} & \cdots & Q_{1,M} \\ Q_{2,1} & Q_{2,2} & \cdots & Q_{2,M} \\ \vdots & \vdots & \ddots & \vdots \\ Q_{M,1} & Q_{M,2} & \cdots & Q_{M,M} \end{bmatrix} \begin{bmatrix} r^{(1)}_{1,1} & r^{(1)}_{1,2} & \cdots & r^{(1)}_{1,M} \\ 0 & r^{(1)}_{2,2} & \cdots & r^{(1)}_{2,M} \\ \vdots & \vdots & \ddots & \vdots \\ 0 & 0 & \cdots & r^{(1)}_{M,M} \end{bmatrix}$$

[Equation 6]

Where, (1) represents a round (for example, a first round), R represents an upper triangular matrix, and Q represents an orthonormal matrix to satisfy $Q*Q=I_{M \times M}$. In this case, indexes of X which are elements of a coefficient matrix of the filter used in the detection are generalized from 1,1 to M,M to be expressed in [Equation 6].

The partial filter generating unit 330 detects the signal based on a first received signal having a length of M shown in [Equation 7] given below for partial detection.

$$Y^{(1)} = [y_1 y_2 \ldots y_M]^T = [y_1^{(1)} y_2^{(1)} \ldots y_M^{(1)}]^T \quad \text{[Equation 7]}$$

The partial filter generating unit 330 calculates (alternatively, acquires) an M*1 vector in which a Q component is removed from the signal sampled by the sampler 320 based on the filter coefficient having the M*M size illustrated in [Equation 7] and the reception signal having the M length as shown in [Equation 8] given below.

$$Z^{(1)} = Q^{(1)*} Y^{(1)} \quad \text{[Equation 8]}$$
$$= R^{(1)} A^{(1)} + \eta^{(1)}$$
$$= \begin{bmatrix} r^{(1)}_{1,1} & r^{(1)}_{1,2} & \cdots & r^{(1)}_{1,M} \\ 0 & r^{(1)}_{2,2} & \cdots & r^{(1)}_{2,M} \\ \vdots & \vdots & \ddots & \vdots \\ 0 & 0 & \cdots & r^{(1)}_{M,M} \end{bmatrix} \cdot \begin{bmatrix} a^{(1)}_1 \\ a^{(1)}_2 \\ \vdots \\ a^{(1)}_M \end{bmatrix} + \begin{bmatrix} \eta^{(1)}_1 \\ \eta^{(1)}_2 \\ \vdots \\ \eta^{(1)}_M \end{bmatrix}$$

Where, * represents conjugation and transpose calculation (alternatively, Hermitian transform), and $Z=[Z_1 Z_2 \ldots Z_M]^T$ and $\eta=Q*W$.

The partial filter generating unit 330 transfers the M*1 vector in which the calculated Q component is removed to the partial ML setting unit 340.

The partial ML setting unit 340 determines (alternatively, sets/selects) the lengths and the number of candidate symbol combinations of the signal to be detected.

The partial ML setting unit 340 sets a maximum likelihood (ML) signal combination having a length of V to be used for signal detection before performing the detection. In this case, the partial ML setting unit 340 performs the step of configuring a candidate signal to be used for the detection according to a set V value expressed by [Equation 9] given below.

$$\psi^{(V)}(C) = \tilde{a}$$

Where, $\psi^{(V)}(C)$ represents a function to output an ML candidate symbol having the length of V under a C-PSK or C-QAM transmission and reception environment and C represents a modulation alphabet size applied to signal modulation. Further, an output of $\psi^{(V)}(C)$ is $C^V = S$ symbol combinations.

For example, when BPSK modulation is used and V is 4, $\psi^{(V)}(C)$ may be expressed as $\psi^{(4)}(2)$ and an output value may be expressed by [Equation 10] given below.

$$\psi^{(4)}(2) = \tilde{a} \quad \text{[Equation 10]}$$
$$= [\tilde{a}(1) \quad \tilde{a}(2) \quad \ldots \quad \tilde{a}(16)]$$
$$= \begin{bmatrix} \tilde{a}_{M-3}(1) & \tilde{a}_{M-3}(2) & \cdots & \tilde{a}_{M-3}(16) \\ \tilde{a}_{M-2}(1) & \tilde{a}_{M-2}(2) & \cdots & \tilde{a}_{M-2}(16) \\ \tilde{a}_{M-1}(1) & \tilde{a}_{M-1}(2) & \cdots & \tilde{a}_{M-1}(16) \\ \tilde{a}_{M}(1) & \tilde{a}_{M}(2) & \cdots & \tilde{a}_{M}(16) \end{bmatrix}$$
$$= \begin{bmatrix} -1 & 1 & \cdots & 1 \\ -1 & -1 & \cdots & 1 \\ -1 & -1 & \cdots & 1 \\ -1 & -1 & \cdots & 1 \end{bmatrix}$$

As described above, the partial ML setting unit 340 generates the candidate ML symbol combinations based on the determined lengths and number of the candidate symbol combinations.

That is, the partial ML setting unit 340 generates all combinations (alternatively, candidate ML symbol combinations) of BPSK modulation having the length of 4 (for example, V=4) as shown in [Equation 10]. Therefore, the partial ML setting unit 340 outputs $2^4$ (16) (S=16) symbol combinations.

As described above, the partial ML setting unit 340 generates the candidate ML symbol combinations through an ML technique.

The signal detecting unit 350 detects residual symbols (alternatively, residual candidate symbols/symbol combinations) in a predetermined part of signals (alternatively, all received signals/all symbols) based on the candidate ML symbol combination generated through the partial ML setting unit 340.

That is, the signal detecting unit 350 uses ã(s) which is each column of a matrix ã for the signal detection.

The signal detecting unit 350 detects M signals based on the filter coefficient having the M*M size. In this case, since the candidate symbol combination having the length of V is set, residual M-V signals are detected in a signal detecting step by the signal detecting unit 350 after setting the candidate symbol combination.

The signal detecting unit 350 uses a subtractive interference cancellation technique (alternatively, decision feedback equalization (DFE)) in order to detect the residual symbols.

Figure 3:
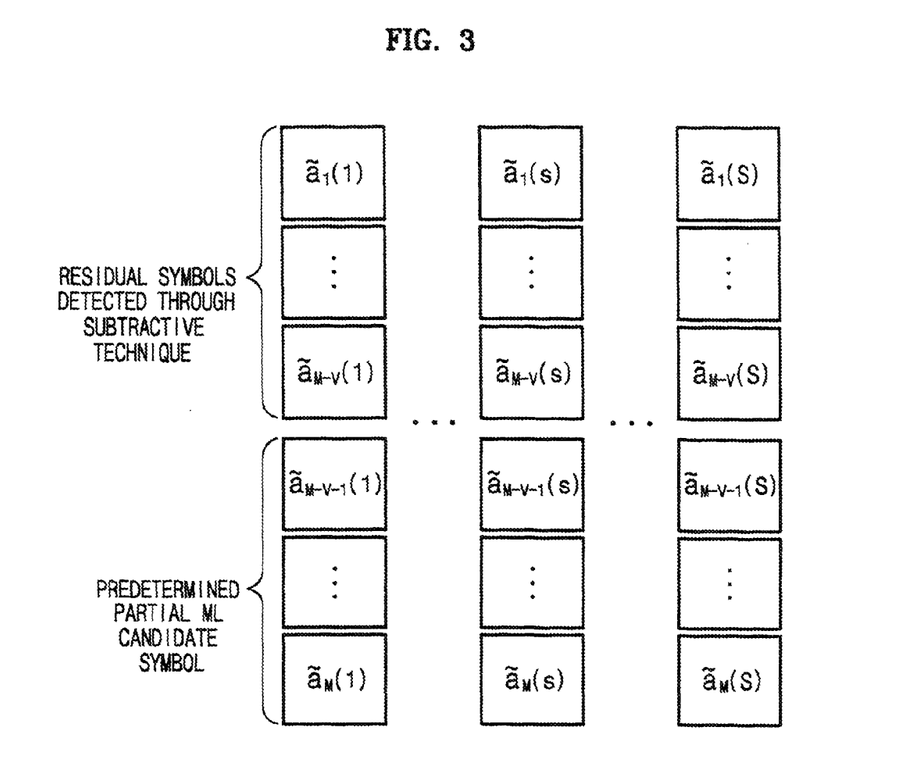
FIG. 3 is a diagram illustrating a symbol detected by a signal detecting unit according to the exemplary embodiment of the present invention.

Results of symbols to be finally detected through the signal detecting unit 350 may be expressed as shown in FIG. 3 given belows.

As illustrated in FIG. 3, in the subtractive interference cancellation technique, since a firstly detected signal totally influences a subsequently detected signal to a last detected signal, it is very important to accurately detect the firstly detected signal. Accordingly, a total of $C^V=S$ candidate symbol combinations are preset based on the candidate symbol combination $\tilde{a}$ determined through the partial ML setting unit 340. As a result, in the present invention, since a total of S firstly detected symbol combinations are considered, detection performance may be significantly improved.

When the total length of symbol combinations to be detected for each step is M and a firstly detected symbol is $\tilde{a}$, the value of V is equal to or smaller than M.

Herein, when V is equal to M, all partial detection signals are generated by the ML candidate symbol combinations. That is, when V=M, the signal is detected based on all ML candidate symbol combinations having the length of M elements without needing performing the subtractive detection.

Residual M-V signals detected based on S candidate symbol combinations having the length of V elements may be expressed by [Equation 11] given below.

$$\tilde{a}_{M-V}^{(1)}(1) = \zeta\left[Z_{MV}^{(1)} - \left(\sum_{i=M-V-1}^{M} r_{M-V,i}^{(1)} \cdot \tilde{a}_i^{(1)}(1)\right) / r_{m,m}^{(1)}\right] \ldots \tilde{a}_1^{(1)}(1) = \zeta\left[Z_1^{(1)} - \left(\sum_{i=2}^{M} r_{1,i}^{(1)} \cdot \tilde{a}_i^{(1)}(1)\right) / r_{1,1}^{(1)}\right]$$

$$\vdots$$

$$\tilde{a}_{M-V}^{(1)}(S) = \zeta\left[Z_{M-V}^{(1)} - \left(\sum_{i=M-V-1}^{M} r_{M-V,i}^{(1)} \cdot \tilde{a}_i^{(1)}(S)\right) / r_{m,m}^{(1)}\right] \ldots \tilde{a}_1^{(1)}(S) = \zeta\left[Z_1^{(1)} - \left(\sum_{i=2}^{M} r_{1,i}^{(1)} \cdot \tilde{a}_i^{(1)}(S)\right) / r_{1,1}^{(1)}\right]$$

[Equation 11]

As described above, the signal detecting unit 350 detects residual symbols through the DFE technique.

The final signal selecting unit 360 chooses (alternatively, selects/determines) as a finally detected signal one signal array among S candidate arrays detected through the signal detecting unit 350.

That is, the final signal selecting unit 360 chooses as the finally detected signal a candidate symbol closest to the signal sampled by the sampler 320 among a plurality of candidate symbols detected through the signal detecting unit 350 by performing a predetermined simplified ML examination.

As described above, a procedure of choosing the finally detected signal by the final signal selecting unit 360 may be expressed by [Equation 12] given below.

$$\hat{a}^{(1)} = \arg\min_{\tilde{a}^{(1)}(s)} \|Y^{(1)} - X^{(1)} \cdot \tilde{a}^{(1)}(s)\|$$ [Equation 12]

$\hat{a}^{(1)}$ shown in [Equation 12] acquired by the final signal selecting unit 360 becomes a finally detected signal.

As described above, the partial filter generating unit 330, the partial ML setting unit 340, the signal detecting unit 350, and the final signal selecting unit 360 detect a final signal for the predetermined part (for example, M*M, M is the natural number) among the signals (alternatively, sampled signals having a total of L symbols) sampled by the sampler 320.

Thereafter, the partial filter generating unit 330, the partial ML setting unit 340, the signal detecting unit 350, and the final signal selecting unit 360 detect subsequent M signals among the signals (alternatively, sampled signals having a total of L symbols) sampled by the sampler 320, set the partial ML for the detected signals, and repeatedly perform signal detecting and final signal choosing procedures.

That is, in the second step, subsequent M signals are detected. In order to perform second signal detection, second M received signals shown in [Equation 13] given below are used.

$$Y^{(2)} = [y_{M+1} y_{M+2} \ldots y_{2M}]^T = [y_1^{(2)} y_2^{(2)} \ldots y_M^{(2)}]^T$$ [Equation 13]

In order to detect the transmission signal through a signal of [Equation 13], a second M*M size filter coefficient shown in [Equation 14] given below is extracted.

$$X^2 = \begin{bmatrix} X_{M+1,M-1} & X_{M+1,M+2} & \ldots & X_{M+1,2M} \\ X_{M+2,M-1} & X_{M+2,M+2} & \ldots & X_{M+2,2M} \\ \vdots & \vdots & \ddots & \vdots \\ X_{2M,M+1} & X_{2M,M+2} & \ldots & X_{2M,2M} \end{bmatrix} =$$

[Equation 14]

-continued $$\begin{bmatrix} X_{1,1}^{(2)} & X_{1,2}^{(2)} & \ldots & X_{1,M}^{(2)} \\ X_{2,1}^{(2)} & X_{2,2}^{(2)} & \ldots & X_{2,M}^{(2)} \\ \vdots & \vdots & \ddots & \vdots \\ X_{M,1}^{(2)} & X_{M,2}^{(2)} & \ldots & X_{M,M}^{(2)} \end{bmatrix}$$

As shown in [Equation 5], an output signal $Y^{(2)}$ of the sampler 320 includes a prior signal, that is, a first transmitted signal as the interference. Therefore, a signal which is previously detected needs to be removed in order to detect second M signals.

Accordingly, a preliminary removing procedure for interference included in the previous signal by the partial filter generating unit 330 may be expressed by [Equation 15] given below.

$$Y^{(2)'} = Y^{(2)} - \beta^{(1)}$$ [Equation 15]

Where, $Y^{(2)'}$ represents a signal acquired by removing a signal ($\beta^{(1)}$) detected in a first round, that is, firstly from M signals $Y^{(2)}$ detected in a second round, that is, secondly.

The firstly detected signal $\beta^{(1)}$ may be expressed by [Equation 16] given below.

$$\beta^{(1)} = \begin{bmatrix} X_{M+1,1} & X_{M+1,2} & \cdots & X_{M+1,M} \\ X_{M+2,1} & X_{M+2,2} & \cdots & X_{M+2,M} \\ \vdots & \vdots & \ddots & \vdots \\ X_{2M,1} & X_{2M,2} & \cdots & X_{2M,M} \end{bmatrix} \cdot \begin{bmatrix} \hat{a}_1^{(1)} \\ \hat{a}_2^{(1)} \\ \vdots \\ \hat{a}_M^{(1)} \end{bmatrix}$$ [Equation 16]

Thereafter, the signal detecting unit 350 detects residual symbols (alternatively, residual candidate symbols/symbol combinations) in a predetermined part of signals (alternatively, all received signals/all symbols) sampled based on the signal $Y^{(2)'}$ from which the interference is removed. Further, the signal detecting unit 350 detects $\hat{a}^{(2)}$ through the same procedure as [Equation 8] to [Equation 16] by using $Y^{(2)'}$.

The final signal selecting unit 360 chooses as the finally detected signal a candidate symbol closest to the signal sampled by the sampler 320 among a plurality of candidate symbols detected through the signal detecting unit 350.

As described above, by operations of the respective constituent elements 310, 320, 330, 340, 350, and 360 included in the receiver 300, the preliminary interference cancellation and detecting procedures are repeatedly performed up to a final L/M step, and as a result, a total of L transmission signals may be detected.

In the signal detection by the receiver 300 according to the present invention, the received signals may be sequentially detected to reduce a detection delay time of the signal and an excessively large matrix calculation may be avoided to significantly reduce the use of a memory.

Since the matrix of the filter coefficient is expressed in a pattern in which a predetermined value is repeated as shown in [Equation 5], the partial filter coefficient having the M*M size has the same value in every signal detecting step. Accordingly, calculations such as filter coefficient extraction and QR resolution are performed only once in an initial detection procedure to save a calculation time.

The communication network 200 included in the signal detecting system 10 according to the present invention is used to reduce an influence of noise in an AWGN channel environment and the partial filter generating unit 330 may apply even a minimum mean square error (MMSE) equalization technique in addition to the AWGN channel. The MMSE method uses a covariance value $\underline{x}$ of noise instead of the aforementioned filter matrix x, and may be expressed by [Equation 17] given below.

$$X = \begin{bmatrix} X \\ \sigma_w^2 I_M \end{bmatrix}$$ [Equation 17]

Where, $\sigma_w^2$ represents the covariance of the noise and $I_M$ represents an M*M diagonal matrix.

As described above, the signal detection according to the present invention may be performed based on the covariance $\underline{x}$ of the noise.

In the signal detecting procedure according to the present invention to which the MMSE method is applied, the partial filter generating unit 330 extracts a first M*M part of the filter as shown in [Equation 18] given below first of all.

$$X^{(1)} = \begin{bmatrix} X_{1,1} & X_{1,2} & \cdots & X_{1,M} \\ X_{2,1} & X_{2,2} & \cdots & X_{2,M} \\ \vdots & \vdots & \ddots & \vdots \\ X_{M,1} & X_{M,2} & \cdots & X_{M,M} \end{bmatrix} =$$ [Equation 18]

$$\begin{bmatrix} X_{1,1}^{(1)} & X_{1,2}^{(1)} & \cdots & X_{1,M}^{(1)} \\ X_{2,1}^{(1)} & X_{2,2}^{(1)} & \cdots & X_{2,M}^{(1)} \\ \vdots & \vdots & \ddots & \vdots \\ X_{M,1}^{(1)} & X_{M,2}^{(1)} & \cdots & X_{M,M}^{(1)} \end{bmatrix}$$

Thereafter, the partial filter generating unit 330 applies the noise covariance to the partial filter extracted as shown in [Equation 18] to generate a partial filter to which the MMSE is applied as shown in [Equation 19] given below.

$$\underline{X}^{(1)} = \begin{bmatrix} X^{(1)} \\ \sigma_w^2 I_M \end{bmatrix}$$ [Equation 17]

Thereafter, the partial filter generating unit 330 performs the QR resolution for the partial filter to which the MMSE generated as shown in [Equation 19] is applied to resolve the partial filter into Q and R matrixes as shown in [Equation 20] given below.

$$\underline{X}^{(1)} = \underline{Q}^{(1)} \underline{R}^{(1)}$$ [Equation 20]

Where, Q and R disclosed in [Equation 20] have the sizes of 2M×2M and 2M*M, respectively according to [Equation 19].

[Equation 21] shows a Q matrix having the size of 2 M×2M as follows.

$$\underline{Q}^{(1)} = \begin{bmatrix} Q_{1,1} & Q_{1,2} & \cdots & Q_{1,M} & \cdots & Q_{1,2M} \\ Q_{2,1} & Q_{2,2} & \cdots & Q_{2,M} & \cdots & Q_{2,2M} \\ \vdots & \vdots & \ddots & \vdots & \cdots & \vdots \\ Q_{M,1} & Q_{M,2} & \cdots & Q_{M,M} & \cdots & Q_{M,2M} \\ \vdots & \vdots & \ddots & \vdots & \cdots & \vdots \\ Q_{2M,1} & Q_{2M,2} & \cdots & Q_{2M,M} & \cdots & Q_{2M,2M} \end{bmatrix}$$ [Equation 21]

A procedure of extracting only the M*M part of the Q matrix is required. When the M*M part which is a part included in [Equation 21] is $\Theta^{(1)}$, $\Theta^{(1)}$ may be expressed by [Equation 22] given below.

$$\Theta^{(1)} = \begin{bmatrix} Q_{1,1} & Q_{1,2} & \cdots & Q_{1,M} \\ Q_{2,1} & Q_{2,2} & \cdots & Q_{2,M} \\ \vdots & \vdots & \ddots & \vdots \\ Q_{M,1} & Q_{M,2} & \cdots & Q_{M,M} \end{bmatrix}$$ [Equation 22]

Thereafter, the partial filter generating unit 330 acquires the M*1 vector without the Q component as shown in [Equation 23] given below based on the first signal $Y^{(1)}$ having the length of M elements for the partial detection.

$$Z^{(1)} = \Theta^{(1)*} Y^{(1)}$$ [Equation 23]

-continued $$= R^{(1)}A^{(1)} + \eta^{(1)}$$

$$= \begin{bmatrix} r_{1,1}^{(1)} & r_{1,2}^{(1)} & \cdots & r_{1,M}^{(1)} \\ 0 & r_{2,2}^{(2)} & \cdots & r_{2,M}^{(1)} \\ \vdots & \vdots & \ddots & \vdots \\ 0 & 0 & \cdots & r_{M,M}^{(1)} \end{bmatrix} \cdot \begin{bmatrix} a_1^{(1)} \\ a_2^{(1)} \\ \vdots \\ a_M^{(1)} \end{bmatrix} + \begin{bmatrix} \eta_1^{(1)} \\ \eta_2^{(1)} \\ \vdots \\ \eta_M^{(1)} \end{bmatrix}$$

Thereafter, by the operations of the partial ML setting unit 340, the single detecting unit 350, and the final signal selecting unit 360 described in the aforementioned AWGN channel environment, a final signal is detected.

As described above, the partial ML is applied to the signal transmitted through the FTN transmission scheme to detect the signal.

Hereinafter, a signal detecting method based on a partial ML according to the present invention will be described in detail with reference to FIGS. 1 to 5.

Figure 4:
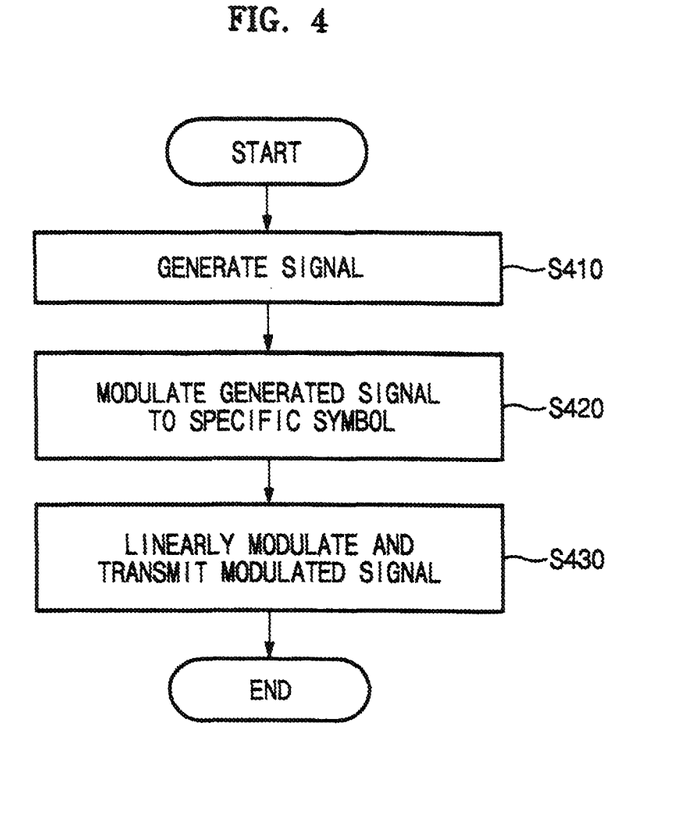
FIG. 4 is a flowchart illustrating a method for detecting a signal based on partial ML according to a first exemplary embodiment of the present invention.

FIG. 4 is a flowchart illustrating a method for detecting a signal based on partial ML according to a first exemplary embodiment of the present invention.

First, the signal generating unit 110 generates (alternatively, generates) a signal (alternatively, a digital signal) (S410).

Thereafter, the signal modulating unit 120 modulates the signal generated by the signal generating unit 110 to a predetermined specific symbol. Herein, a modulation method may include a PSK scheme, a QAM scheme, and the like (S420).

Thereafter, the FTN based transmission filter 130 linearly modulates the signal modulated through the signal modulating unit 120 at a predetermined symbol transmission speed (for example, $\tau T$). Herein, $\tau$ represents a sampling time control function and is selected (alternatively, set) as any one of values which are larger than 0 and smaller than 1.

The transmission filter 130 transmits the linearly modulated signal (alternatively, the transmission signal) to the receiver 300 through a communication network (alternatively, an AWGN channel) 200.

As one example, as shown in [Equation 1], the transmission filter 130 linearly modulates the signal a(t) modulated through the signal modulating unit 120 at a predetermined symbol transmission speed (for example, $\tau T$) to acquire the signal s(t). Thereafter, the transmission filter 130 transmits the linearly modulated signal s(t) to the receiver 300 through a communication network (alternatively, an AWGN channel) 200 (S430).

Figure 5:
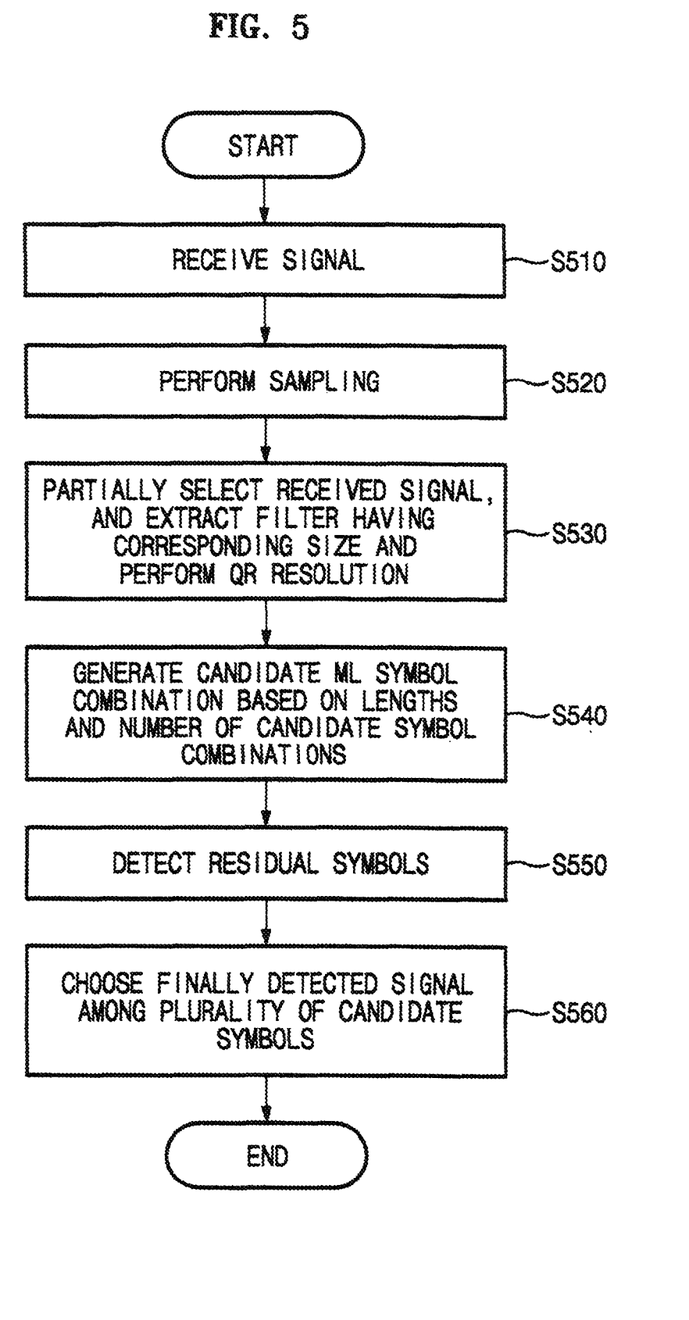
FIG. 5 is a flowchart illustrating a method for detecting a signal based on partial ML according to a second exemplary embodiment of the present invention.

FIG. 5 is a flowchart illustrating a method for detecting a signal based on partial ML according to a second exemplary embodiment of the present invention.

First, the reception filter 310 receives the signal (alternatively, the transmission signal) transmitted by the transmitter 100 through the communication network (alternatively, the AWGN channel) 200. Herein, for the communication network 200, the MMSE method may be used as well as the AWGN channel.

The reception filter 310 output a signal y(t) of which noise is minimized by filtering the signal r(t) received from the transmitter 100 (S510).

Thereafter, the sampler 320 samples the digitally transformed signal (alternatively, transformed digital signal) at an inverse number (for example, $1/\tau T$) of the predetermined symbol transmission speed (for example, $\tau T$).

As one example, as shown in [Equation 2], the sampler 320 samples the digitally transformed signal y(t) at the inverse number (for example, $1/\tau T$) of the predetermined symbol transmission speed to acquire a sampled signal y(n$\tau$T) (S520).

Thereafter, the partial filter generating unit 330 performs partial detection as large as a predetermined part (for example, M*M, M is a natural number) in the sampled signal.

The partial filter generating unit 330 performs the QR resolution for the partially detected part.

As one example, when the signal is detected by dividing the signal having the length of L (for example, 100) elements into M (for example, 10) elements, the partial filter generating unit 330 performs the partial detection as large as the predetermined part (for example, M*M, M is a natural number) in the sampled signals. As shown in [Equation 6], the partial filter generating unit 330 performs the QR resolution for the partially detected part and thereafter, acquires the M*1 vector in which the Q component is removed from the sampled signal as shown in [Equation 8] (S530).

Thereafter, the partial ML setting unit 340 determines (alternatively, sets/selects) the lengths and the number of candidate symbol combinations of the signal to be detected.

The partial ML setting unit 340 generates the candidate ML symbol combination based on the determined lengths and the number of the candidate symbol combinations.

As one example, the partial ML setting unit 340 determines the length (for example, V=4) of the candidate symbol combination of the signal to be detected and the number (for example, 16 which is $2^4$) of candidate symbols of the detected signal. Further, the partial ML setting unit 340 generates the candidate ML symbol combination based on the determined lengths and the number of the candidate symbol combinations as shown in [Equation 10] (S540).

Thereafter, the signal detecting unit 350 detects residual symbols (alternatively, residual candidate symbols/symbol combinations) in a predetermined part of signals sampled based on the candidate ML symbol combination generated through the partial ML setting unit 340.

As one example, the signal detecting unit 350 detects residual symbols corresponding to M−4 (=10−4=6) based on the candidate ML symbol combination generated through the partial ML setting unit 340 (S550).

Thereafter, the final signal selecting unit 360 chooses (selects/determines) as the finally detected signal a candidate symbol closest to the signal sampled by the sampler 320 among a plurality of candidate symbols detected through the signal detecting unit 350 by performing a predetermined simplified ML examination.

As one example, the final signal selecting unit 360 chooses as the finally detected signal one signal array among S candidate arrays detected through the signal detecting unit 350 (S560).

Thereafter, the receiver 300 returns to the step (step S530) of performing the partial detection as large as a predetermined subsequent part in all of the sampled signals.

As one example, since the final signals for the predetermined part (M*M) have been detected in the previous steps (steps S530 to S560), M final signals for each signal are detected by the unit of M signals, respectively, through (alternatively, repeatedly performing) L/M procedures.

According to the exemplary embodiments of the present invention, a signal is detected by applying partial ML to a signal transmitted through an FTN transmission scheme to easily and simply detect the transmitted signal and sequentially detect received signals to reduce a detection delay time of the signals and avoid an excessively large matrix calculation, thereby significantly reducing the use of a memory.

Those skilled in the art can modify and change the above description within the scope without departing from an essential characteristic of the present invention. Accordingly, the embodiments disclosed herein are intended not to limit but to describe the technical spirit of the present invention, and the scope of the spirit of the present invention is not limited to the embodiments. The protection scope of the present invention should be interpreted by the appended claims and all the technical spirits in the equivalent range thereto are intended to be embraced by the claims of the present invention.

What is claimed is:

1. A method for detecting a signal in a receiver, the signal being transmitted by a transmitter, the method comprising:
   selecting, by a partial filter generating unit, a signal as large as a predetermined magnitude among sampled signals and extracting a filter coefficient for the selected signal to perform an orthogonal matrix Q and an upper triangular matrix R (QR) resolution for the filter coefficient;
   responsive to the selecting, determining, by a partial maximum likelihood (ML) setting unit, the lengths and the number of candidate symbol combinations of the signal to be detected;
   generating, by the partial ML setting unit, a candidate ML symbol combination based on the determined lengths and number of candidate symbol combinations;
   detecting, by a signal detecting unit, candidate symbols in a predetermined part of the sampled signals based on the generated candidate ML symbol combination; and
   choosing, by a final signal selecting unit, a candidate symbol closest to the sampled signals among the detected candidate symbols as a finally detected signal.

2. The method of claim 1, further comprising:
   receiving, by a reception filter, the signal transmitted from the transmitter to produce a received signal; and
   sampling, by a sampler, the received signal at a predetermined symbol transmission speed to acquire the sampled signals.

3. The method of claim 2, wherein the receiver and the transmitter are connected through an additive white Gaussian noise (AWGN) channel or a minimum mean square error (MMSE) method.

4. The method of claim 2, wherein an output of the sampler is acquired by adding noise to a product of a coefficient of a transmission filter included in the transmitter, a coefficient of the reception filter, and a transmission symbol corresponding to a signal received through the reception filter.

5. The method of claim 1, wherein in the performing of the partial detection as large as a predetermined part among the sampled signals, a sampled signal having a length of L elements is divided to M elements corresponding to the predetermined part to perform partial detection for M signals through L/M procedures, where L and M are natural numbers and L/M is not 0.

6. The method of claim 1, wherein in the generating of the candidate ML symbol combination, the candidate ML symbol combination is generated through an ML technique.

7. The method of claim 1, wherein in the detecting of the candidate symbols, the candidate symbols are detected through a decision feedback equalization (DFE) technique.

* * * * *